United States Patent
Miyachi et al.

(10) Patent No.: US 12,327,839 B2
(45) Date of Patent: Jun. 10, 2025

(54) PRISMATIC NON-AQUEOUS ELECTROLYTE SECONDARY BATTERY

(71) Applicant: Panasonic Intellectual Property Management Co., Ltd., Osaka (JP)

(72) Inventors: Yoshikazu Miyachi, Hyogo (JP); Yukitoshi Uehara, Aichi (JP); Yuma Kamiyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 674 days.

(21) Appl. No.: 17/420,759

(22) PCT Filed: Nov. 29, 2019

(86) PCT No.: PCT/JP2019/046733
§ 371 (c)(1),
(2) Date: Jul. 6, 2021

(87) PCT Pub. No.: WO2020/158153
PCT Pub. Date: Aug. 6, 2020

(65) Prior Publication Data
US 2022/0115703 A1    Apr. 14, 2022

(30) Foreign Application Priority Data
Jan. 30, 2019   (JP) ................. 2019-014663

(51) Int. Cl.
*H01M 10/0569* (2010.01)
*H01M 4/133* (2010.01)
(Continued)

(52) U.S. Cl.
CPC ....... *H01M 10/0569* (2013.01); *H01M 4/133* (2013.01); *H01M 4/134* (2013.01);
(Continued)

(58) Field of Classification Search
CPC .. H01M 10/0569; H01M 4/133; H01M 4/134; H01M 4/621; H01M 10/052;
(Continued)

(56) References Cited

U.S. PATENT DOCUMENTS

| | | | |
|---|---|---|---|
| 2009/0253044 A1* | 10/2009 | Nogi | H01M 4/38 429/326 |
| 2011/0183218 A1* | 7/2011 | Odani | H01M 10/4235 429/342 |

(Continued)

FOREIGN PATENT DOCUMENTS

| | | | | |
|---|---|---|---|---|
| JP | 2010-251126 | * | 11/2010 | ........... C01B 32/205 |
| JP | 2012-003997 A | | 1/2012 | |

(Continued)

OTHER PUBLICATIONS

Béguin et al. "Correlation of the irreversible lithium capacity with the active surface of modified carbons." Carbon 43 (2005) 2160-2167 (Year: 2005).*

(Continued)

*Primary Examiner* — Michael L Dignan
(74) *Attorney, Agent, or Firm* — WHDA, LLP

(57) ABSTRACT

This prismatic non-aqueous electrolyte secondary battery is provided with a negative electrode and a nonaqueous electrolyte. The negative electrode is provided with a negative electrode current collector and a negative electrode mixture layer formed on the negative electrode current collector. The negative electrode mixture layer comprises a first layer containing a first carbon active material, a Si active material and a polyacrylic acid or a salt thereof, and a second layer containing a second carbon active material. The nonaqueous solvent configuring the nonaqueous electrolyte contains a cyclic carbonate. The total content of the cyclic carbonate is 20-30 vol % of the total volume of the nonaqueous solvent, and the content of the ethylene carbonate belonging to the (Continued)

cyclic carbonate is less than or equal to 10 vol % of the total volume of the nonaqueous solvent. The nonaqueous electrolyte contains vinylene carbonate.

4 Claims, 1 Drawing Sheet

(51) Int. Cl.
| | |
|---|---|
| H01M 4/134 | (2010.01) |
| H01M 4/62 | (2006.01) |
| H01M 10/052 | (2010.01) |
| H01M 10/0567 | (2010.01) |
| H01M 50/103 | (2021.01) |

(52) U.S. Cl.
CPC ......... *H01M 4/621* (2013.01); *H01M 10/052* (2013.01); *H01M 10/0567* (2013.01); *H01M 50/103* (2021.01)

(58) Field of Classification Search
CPC ........... H01M 10/0567; H01M 50/103; H01M 2300/0037; H01M 2300/004; H01M 4/483; H01M 4/587; H01M 4/622; H01M 4/0404; H01M 4/366; H01M 10/0525; Y02E 60/10
See application file for complete search history.

(56) References Cited

U.S. PATENT DOCUMENTS

| | | | |
|---|---|---|---|
| 2014/0356724 A1 | 12/2014 | Iwami | |
| 2016/0294001 A1* | 10/2016 | Suga | ...................... H01M 4/133 |
| 2017/0110729 A1* | 4/2017 | Tsuchiya | ............... H01M 4/587 |
| 2018/0062158 A1* | 3/2018 | Kim | ....................... H01M 4/364 |
| 2019/0296332 A1* | 9/2019 | Yao | ................... H01M 10/0525 |
| 2021/0104750 A1 | 4/2021 | Ito et al. | |
| 2021/0194060 A1* | 6/2021 | Liang | ................ H01M 10/0567 |
| 2021/0399289 A1* | 12/2021 | Eshraghi | ............... H01M 4/133 |

FOREIGN PATENT DOCUMENTS

| | | |
|---|---|---|
| JP | 2017-022142 A | 1/2017 |
| WO | 2007/043526 A1 | 4/2007 |
| WO | 2013/125167 A1 | 8/2013 |
| WO | 2018/179817 A1 | 10/2018 |

OTHER PUBLICATIONS

English Translation of International Search Report dated Feb. 10, 2020, issued in counterpart Application No. PCT/JP2019/046733. (2 pages).

The Extended European Search Report dated Feb. 22, 2022, issued in counterpart EP Application No. 19913203.6. (7 pages).

* cited by examiner

PRISMATIC NON-AQUEOUS ELECTROLYTE SECONDARY BATTERY

TECHNICAL FIELD

The present disclosure relates to a rectangular-shaped non-aqueous electrolyte secondary battery.

BACKGROUND ART

It is known that a Si-based active material can intercalate a larger amount of lithium ions per unit volume than a carbon-based active material such as graphite. For example, PATENT LITERATURE 1 discloses a negative electrode for a non-aqueous electrolyte secondary battery, comprising a negative electrode mixture layer containing a Si-based active material and graphite each as a negative electrode active material. On the negative electrode disclosed in PATENT LITERATURE 1, a carbon-containing layer containing carbon and a binder is formed on the surface of the negative electrode mixture layer on the side facing a positive electrode, the carbon-containing layer having a thickness of 10% or less of the thickness of the negative electrode mixture layer.

CITATION LIST

Patent Literature

PATENT LITERATURE 1: Japanese Unexamined Patent Application Publication No. 2012-3997

SUMMARY

Technical Problem

In the negative electrode including a Si-based active material, there is a risk that the negative electrode is swollen by a large change in the volume of the Si-based active material accompanying charging/discharging cycles, which leads to swell of a battery. Swell of a battery due to swelling of a negative electrode is more likely to occur in a rectangular-shaped battery in particular than in a cylinder type battery. In a battery module or the like in which a plurality of batteries is arranged, when swell of the battery occurs, stress is applied to the battery module and the battery module is damaged in some cases.

It is an advantage of the present disclosure to provide a rectangular-shaped non-aqueous electrolyte secondary battery comprising a negative electrode including a Si-based active material, wherein swell of the battery accompanying charging/discharging cycles may be suppressed.

Solution to Problem

The rectangular-shaped non-aqueous electrolyte secondary battery that is one aspect of the present disclosure comprises: a positive electrode; a negative electrode; and a non-aqueous electrolyte having an electrolyte salt and a non-aqueous solvent, wherein the negative electrode comprises: a negative electrode current collector; and a negative electrode mixture layer formed on the negative electrode current collector, the negative electrode mixture layer has: a first layer formed on the negative electrode current collector, the first layer including a first carbon-based active material, a Si-based active material, and polyacrylic acid or a salt thereof; and a second layer formed on the first layer, the second layer including a second carbon-based active material, the mass of the first layer is 50% by mass or more and less than 90% by mass based on the mass of the negative electrode mixture layer, the mass of the second layer is more than 10% by mass and 50% by mass or less based on the mass of the negative electrode mixture layer, the non-aqueous solvent includes a cyclic carbonate, the content of the cyclic carbonate is 20% by volume or more and 30% by volume or less based on the total volume of the non-aqueous solvent, the content of ethylene carbonate belonging to the cyclic carbonate is 10% by volume or less based on the total volume of the non-aqueous solvent, and the non-aqueous electrolyte includes vinylene carbonate.

Advantageous Effect of Invention

According to the rectangular-shaped non-aqueous electrolyte secondary battery of the present disclosure, swell of a battery accompanying charging/discharging cycles may be suppressed.

DESCRIPTION OF EMBODIMENTS

Figure 1:
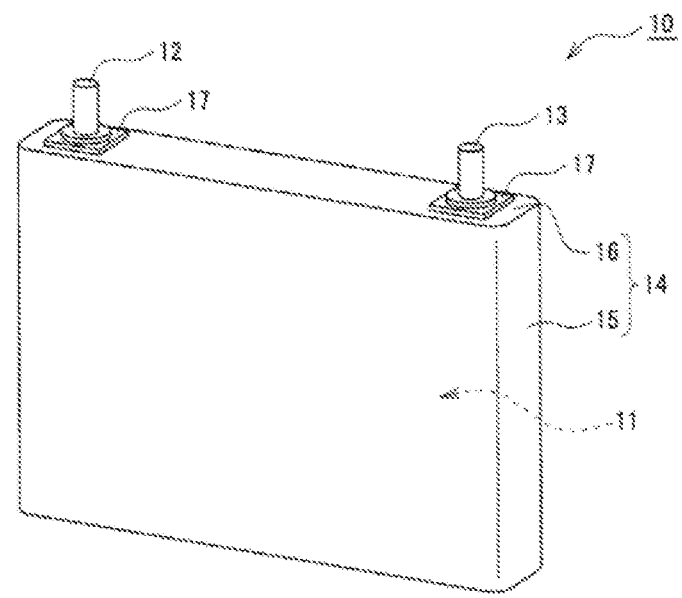
FIG. 1 is a perspective view showing a non-aqueous electrolyte secondary battery as one exemplary embodiment.

The rectangular-shaped non-aqueous electrolyte secondary battery that is one aspect of the present disclosure comprises: a positive electrode; a negative electrode; and a non-aqueous electrolyte having an electrolyte salt and a non-aqueous solvent, wherein the negative electrode comprises: a negative electrode current collector; and a negative electrode mixture layer formed on the negative electrode current collector, the negative electrode mixture layer has: a first layer formed on the negative electrode current collector, the first layer including a first carbon-based active material, a Si-based active material, and polyacrylic acid or a salt thereof; and a second layer formed on the first layer, the second layer including a second carbon-based active material, the mass of the first layer is 50% by mass or more and less than 90% by mass based on the mass of the negative electrode mixture layer, the mass of the second layer is more than 10% by mass and 50% by mass or less based on the mass of the negative electrode mixture layer, the non-aqueous solvent includes a cyclic carbonate, the content of the cyclic carbonate is 20% by volume or more and 30% by volume or less based on the total volume of the non-aqueous solvent, the content of ethylene carbonate belonging to the cyclic carbonate is 10% by volume or less based on the total volume of the non-aqueous solvent, and the non-aqueous electrolyte includes vinylene carbonate.

As described above, by making the negative electrode mixture layer into a multilayer structure comprising the first layer disposed on the negative electrode current collector and the second layer disposed on the first layer, allowing polyacrylic acid or the salt thereof having a high bonding force with the Si-based active material having a large change in volume accompanying charging/discharging cycles to be included in the first layer, and limiting the masses of the first layer and the second layer to the above ranges, swelling of the negative electrode accompanying charging/discharging cycles is more suppressed than in the case where the Si-based active material is dispersed in the whole negative electrode mixture layer. The cyclic carbonate has excellent characteristics, such as a high dielectric constant and a low viscosity, but on the other hand, a side reaction accompanying charge and discharge is likely to occur, and therefore a coating is formed sequentially on the surface of the negative electrode, so that swelling of the negative electrode is likely to occur. This is particularly remarkable in ethylene carbonate belonging to the cyclic carbonate. Accordingly, by limiting the content of the cyclic carbonate to the above range as described above and, further, limiting the content of ethylene carbonate belonging to the cyclic carbonate to the above range, the amount of the coating to be formed sequentially on the surface of the negative electrode accompanying charging/discharging cycles is controlled, and swelling of the negative electrode accompanying charging/discharging cycles is suppressed. It is inferred that effects of suppressing deterioration in input characteristics and cyclic characteristics of the battery are also obtained by setting the content of the cyclic carbonate to the above range. Moreover, as described above, when vinylene carbonate is included in the non-aqueous electrolyte, an electrochemically stable coating is thereby formed on the surface of the negative electrode, and therefore the amount of the coating to be formed sequentially on the surface of the negative electrode accompanying charging/discharging cycles is controlled and swelling of the negative electrode accompanying charging/discharging cycles is suppressed. According to the rectangular-shaped non-aqueous electrolyte secondary battery that is one aspect of the present disclosure, swelling of the negative electrode can significantly be suppressed by combination of respective compositions described above, and therefore battery swell accompanying charging/discharging cycles can effectively be suppressed.

Hereinafter, embodiments of a rectangular-shaped non-aqueous electrolyte secondary battery of the present disclosure will be described in detail with reference to the drawings.

FIG. 1 is a perspective view showing a rectangular-shaped non-aqueous electrolyte secondary battery as one exemplary embodiment. As shown in FIG. 1 as an example, the non-aqueous electrolyte secondary battery 10 comprises: an electrode assembly 11; a non-aqueous electrolyte; and a rectangular-shaped battery case 14 that houses these. The electrode assembly 11 has a positive electrode, a negative electrode, and a separator. The electrode assembly 11 is preferably a lamination type electrode assembly in which, for example, positive electrodes and negative electrodes are alternately laminated one by one with separators interposed therebetween. However, the electrode assembly is not limited to the lamination type electrode assembly, and may be, for example, a flat type electrode assembly obtained by winding a long positive electrode and a long negative electrode together with a separator interposed therebetween and then crushing a resultant product into a flat shape.

The rectangular-shaped battery case 14 has: a case body 15 having an approximately box shape; a sealing assembly 16 that closes an opening of the case body 15; a positive electrode terminal 12 electrically connected to the positive electrode; and a negative electrode terminal 13 electrically connected to the negative electrode. The case body 15 and the sealing assembly 16 are formed of, for example, a metal material containing aluminum as a main component. The positive electrode terminal 12 and the negative electrode terminal 13 are fixed to the sealing assembly 16 through an insulating member 17. The sealing assembly 16 is generally provided with a gas discharge mechanism (not shown).

Hereinafter, the positive electrode, the negative electrode, the separator, and the non-aqueous electrolyte included in the non-aqueous electrolyte secondary battery 10 will be described in detail.

[Positive Electrode]

The positive electrode comprises: a positive electrode current collector; and a positive electrode mixture layer formed on the positive electrode current collector. For example, foil of a metal, such as aluminum or an aluminum alloy, that is stable in the electric potential range of the positive electrode, a film with such a metal disposed on an outer layer, and the like can be used for the positive electrode current collector. The positive electrode mixture layer includes, for example, a positive electrode active material, a binder, and a conductive agent. The positive electrode mixture layer is preferably formed on each side of the positive electrode current collector. The positive electrode can be produced by, for example, applying a positive electrode mixture slurry including the positive electrode active material, the binder, the conductive agent, and the like on the positive electrode current collector, and drying and rolling the resultant coating film, thereby forming the positive electrode mixture layer on each side of the positive electrode current collector.

The positive electrode active material contains a lithium-containing metal composite oxide as a main component. Examples of the metal element contained in the lithium-containing metal composite oxide include Ni, Co, Mn, Al, B, Mg, Ti, V, Cr, Fe, Cu, Zn, Ga, Sr, Zr, Nb, In, Sn, Ta, W, Ca, Sb, Pb, Bi, and Ge. One example of suitable lithium-containing metal composite oxides is a composite oxide containing at least one of Ni, Co, Mn, and Al.

Examples of the conductive agent included in the positive electrode mixture layer include carbon materials such as carbon black, acetylene black, Ketjenblack, and graphite. Examples of the binder included in the positive electrode mixture layer include fluororesins such as polytetrafluoroethylene (PTFE) and polyvinylidene fluoride (PVDF), polyacrylonitrile (PAN), polyimides, acrylic resins, and polyolefins. These resins may be combined with carboxymethyl cellulose (CMC) or a salt thereof, polyethylene oxide (PEO), or the like.

[Negative Electrode]

Figure 2:
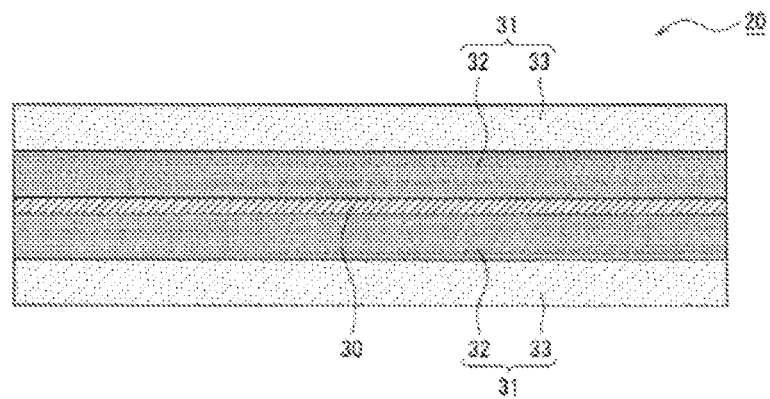
FIG. 2 is a sectional view of a negative electrode as one exemplary embodiment.

FIG. 2 is a sectional view of a negative electrode as one exemplary embodiment. As shown in FIG. 2 as an example, the negative electrode 20 comprises: a negative electrode current collector 30; and a negative electrode mixture layer 31 formed on the negative electrode current collector 30. For example, foil of a metal, such as copper or a copper alloy, that is stable in the electric potential range of the negative electrode, a film with such a metal disposed on an outer layer, and the like can be used for the negative electrode current collector 30. The negative electrode mixture layer 31 is preferably formed on each side of the negative electrode current collector 30. The negative electrode 20 can be produced by, for example, applying a negative electrode mixture slurry including the negative electrode active material, the binder, and the like on the negative electrode current collector 30, and drying and rolling the resultant coating film, thereby forming the negative electrode mixture layer 31 on each side of the negative electrode current collector 30.

The negative electrode mixture layer 31 has a first layer 32 formed on the negative electrode current collector 30 and a second layer 33 formed on the first layer 32. The first layer 32 is a layer (lower layer) including a first carbon-based active material, a Si-based active material, and polyacrylic acid or a salt thereof. The second layer 33 is a layer (upper layer) including a second carbon-based active material. Preferably, the second layer 33 includes only the carbon-based active material as a negative electrode active material and is substantially free of the Si-based active material (for example, less than 0.1% by mass based on the mass of the second layer 33) from the viewpoint of suppressing swelling of the negative electrode accompanying charging/discharging cycles, and the like.

The mass of the first layer 32 is 50% by mass or more and less than 90% by mass, and preferably 50% by mass to 70% by mass based on the mass of the negative electrode mixture layer 31 in terms of suppressing swelling of the negative electrode accompanying charging/discharging cycles, and the like. The mass of the second layer 33 is more than 10% by mass and 50% by mass or less based on the mass of the negative electrode mixture layer 31 in terms of suppressing swelling of the negative electrode accompanying charging/discharging cycles, and the like, and preferably 30% by mass to 50% by mass further in terms of the input characteristics and the like of the battery. In short, the mass ratio of the first layer 32 to the second layer 33 (the second layer 33/the first layer 32) is more than 0.1 and 0.5 or less, and preferably 0.3 to 0.5.

The filling density of the negative electrode mixture layer 31 is, for example, preferably 1.60 g/cm$^3$ or more, and more preferably 1.60 g/cm$^3$ to 1.70 g/cm$^3$ in terms of improving the battery capacity, and the like. The filling densities of the first layer 32 and the second layer 33 may be the same with or different from each other. The filling density of the second layer 33 is preferably, for example, lower than the filling density of the first layer 32. One example of the filling density of the second layer 33 is 1.40 g/cm$^3$ to 1.55 g/cm$^3$. One example of the filling density of the first layer 32 is 1.65 g/cm$^3$ to 1.90 g/cm$^3$.

The thickness of the negative electrode mixture layer 31 is, for example, 30 μm-100 μm, or 50 μm-80 μm on the one side of the negative electrode current collector 30. The thicknesses of the first layer 32 and the second layer 33 may be the same with or different from each other as long as the mass ratio is satisfied. The thickness of the first layer 32 may be larger or smaller than the thickness of the second layer 33. A layer other than the first layer 32 and the second layer 33 may be included in the negative electrode mixture layer 31 within a range where the advantage of the present disclosure is not impaired.

For example, graphite, amorphous carbon, or the like is used as the first carbon-based active material included in the first layer 32 and the second carbon-based active material included in the second layer 33. Among others, graphite is preferable. Examples of the graphite include: natural graphite, such as scale-like graphite; and artificial graphite, such as lump artificial graphite and graphitized mesophase carbon microbeads. The first and the second carbon-based active materials may also be covered graphite particles or the likes such that the surfaces of graphite particles are each covered with a covering layer including amorphous carbon. One of graphite and the like may be used singly, or two or more graphite and the like may be combined as the first and the second carbon-based active materials.

The first carbon-based active material and the second carbon-based active material may be of the same carbon material or may be different types of carbon materials. For example, the same natural graphite may be used as the first carbon-based active material and the second carbon-based active material; natural graphite may be used as the first carbon-based active material, and artificial graphite or amorphous carbon may be used as the second carbon-based active material; or the first carbon-based active material and the second carbon-based active material may be other than these examples. The first carbon-based active material and the second carbon-based active material preferably have the following physical properties in terms of enabling suppression of swell of the battery due to swelling of the negative electrode accompanying charging/discharging cycles and improvements in the input characteristics, the cyclic characteristics, and the like of the battery.

The tap density of the second carbon-based active material included in the second layer 33 is preferably higher than the tap density of the first carbon-based active material included in the first layer 32 in terms of improving the input characteristics and the cyclic characteristics of the battery. For example, preferably, the first carbon-based active material has a tap density of 0.89 g/cm$^3$ to 0.95 g/cm$^3$, and the second carbon-based active material has a tap density of 1.0 g/cm$^3$ to 1.25 g/cm$^3$. The tap density of the carbon-based active materials is measured according to the method specified in JIS Z-2504. In the present specification, the bulk density measured after tapping a sample powder collected in a container 250 times is defined as the tap density.

The BET specific surface area of the second carbon-based active material included in the second layer 33 is preferably lower than the BET specific surface area of the first carbon-based active material included in the first layer 32 in terms of improving the input characteristics and the cyclic characteristics of the battery, and the like. For example, preferably, the first carbon-based active material has a BET specific surface area of 3.0 m$^2$/g to 8.0 m$^2$/g, and the BET specific surface area of the second carbon-based active material is lower than the BET specific surface area of the first carbon-based active material and is 0.9 m$^2$/g to 4.0 m$^2$/g. The BET specific surface area is measured according to a BET method (nitrogen adsorption method) described in JIS R1626.

With respect to the optimum combination of the tap densities and the BET specific surface areas of the first carbon-based active material and the second carbon-based active material, when the first carbon-based active material has, for example, a tap density of 0.86 g/cm$^3$ to 0.89 g/cm$^3$ and a BET specific surface area of 3.9 m$^2$/g to 6.8 m$^2$/g, the second carbon-based active material has a tap density of 1.03 g/cm$^3$ to 1.08 g/m$^3$ and a BET specific surface area of 2.8 m$^2$/g to 3.1 m$^2$/g in terms of improving the input characteristics and the cyclic characteristics of the battery.

The first and the second carbon-based active materials are generally secondary particles in which a large number of primary particles aggregate. The average particle diameters of the first and the second carbon-based active materials (secondary particles) each are not particularly limited, and are, for example, 1 μm to 30 μm. The average particle diameters of the first and the second carbon-based active materials each mean a volume average particle diameter ($D_v50$) at which an integrated volume value reaches 50% in a particle size distribution measured by a laser diffraction scattering method.

In the first layer 32, the Si-based active material, and polyacrylic acid (PAA) or the salt thereof in addition to the first carbon-based active material are included. PAA or the salt thereof can strongly bind particles of the negative electrode active materials (the Si-based active material and the first carbon-based active material).

The Si-based active material is at least one of Si and a Si-containing compound, but is preferably a Si-containing compound exhibiting a smaller change in volume during charge and discharge than Si. The Si-containing compound is not particularly limited as long as it is a compound containing Si, but is preferably a compound represented by $SiO_x$ ($0.5 \leq x \leq 1.5$). The Si-containing compound may be used singly, or two or more of the Si-containing compounds may be combined. A conductive coating formed of a material having higher electrical conductivity than the Si-containing compound is preferably formed on the surfaces of the particles of the Si-containing compound. The average particle diameter ($D_v50$) of the Si-containing compound is, for example, 1 μm to 15 μm.

$SiO_x$ has a structure in which, for example, Si is dispersed in amorphous $SiO_2$ matrices. $SiO_x$ may include lithium silicate (for example, lithium silicate represented by $Li_{2z}SiO_{(2+z)}$ ($0<z<2$)) in the particles, and may have a structure in which Si is dispersed in lithium silicate phases.

The conductive coating is preferably a carbon coating. The carbon coating is formed in an amount of, for example, 0.5% by mass to 10% by mass based on the mass of the $SiO_x$ particles. Examples of a method for forming the carbon coating include a method of mixing coal tar or the like with Si-containing compound particles and subjecting the resultant mixture to a heat treatment, and a chemical vaper deposition method (CVD method) using a hydrocarbon gas or the like. In addition, the carbon coating may be formed by fixing carbon black, Ketjenblack, or the like firmly to the surfaces of the Si-containing compound particles using a binder.

The mass ratio of the first carbon-based active material to the Si-based active material included in the first layer 32 is, for example, 95:5 to 70:30, and preferably 95:5 to 80:20. By setting the mass ratio within the range, for example, the capacity of the battery is enhanced more or the change in volume of the Si-based active material is reduced more in some cases than in the case where the mass ratio is out of the range. In the first layer 32, the proportion of the Si-based active material in the negative electrode active material is preferably 5% by mass to 20% by mass, and more preferably 5% by mass to 15% by mass.

PAA or the salt thereof included in the first layer 32 functions as a binder. The salt of PAA is, for example, a lithium salt, a sodium salt, a potassium salt, or an ammonium salt. The first layer 32 preferably includes a second binder in addition to PAA and the salt thereof. Examples of the second binder include CMC or a salt thereof, a styrene-butadiene copolymer (SBR), polyvinyl alcohol (PVA), and PEO. Among others, CMC or the salt thereof, and SBR are preferable. The first layer 32 includes, for example, PAA or a salt thereof, CMC or a salt thereof, and SBR as the binder. The content of the binder included in the first layer 32 is, for example, preferably 0.5% by mass to 10% by mass, and more preferably 1% by mass to 5% by mass based on the mass of the first layer 32. The content of PAA or the salt thereof is, for example, preferably 20% by mass or more, and more preferably 20% by mass to 50% by mass based on the mass of the binder in the first layer 32 in terms of suppressing swelling of the negative electrode accompanying charging/discharging cycles, and the like.

In the second layer 33, a binder is preferably included in addition to the second carbon-based active material. Examples of the binder included in the second layer 33 include CMC or a salt thereof, SBR, PVA, and PEO. Among others, CMC or the salt thereof, and SBR are preferable. The content ratio of PAA or the salt thereof in the second layer 33 is preferably lower than that in the first layer 32, and more preferably, PAA or the salt thereof is not contained substantially (for example, less than 0.1% by mass based on the mass of the binder included in the second layer 33) in terms of the input characteristics of a battery or the like. That is, PAA or the salt thereof is more preferably included only in the first layer 32. The second layer 33 includes, for example, CMC or the salt thereof, and SBR as the binder. The content of the binder included in the second layer 33 is, for example, preferably 0.5% by mass to 10% by mass, and more preferably 1% by mass to 5% by mass based on the mass of the second layer 33.

The negative electrode 20 is produced by, for example, the following method. A first negative electrode mixture slurry for the first layer 32, the slurry including: the first carbon-based active material; the Si-based active material; the binder including PAA or the salt thereof; and the like, is prepared. A second negative electrode mixture slurry for the second layer 33, the slurry including: the second carbon-based active material; the binder; and the like, is prepared. The first negative electrode mixture slurry is applied on the negative electrode current collector 30, and the resultant coating film is dried to form the first layer 32 on the negative electrode current collector 30. Subsequently, the second negative electrode mixture slurry is applied on the first layer 32, the resultant coating film is dried to form the second layer 33 on the first layer 32, and the first layer 32 and the second layer 33 are then compressed. In this manner, the negative electrode 20 such that the negative electrode mixture layer 31 including the first layer 32 and the second layer 33 is formed on the negative electrode current collector 30 is obtained. The second layer 33 may be formed into a multilayer structure by preparing second negative electrode mixture slurries each having different components or a different content of each component and applying the second negative electrode mixture slurries in sequence. The same applies to the first layer 32.

[Separator]

For example, an ion-permeable and insulating porous sheet is used as the separator. Specific examples of the porous sheet include a microporous thin film, a woven fabric, and a nonwoven fabric. As the material for the separator, an olefin-based resin such as polyethylene, polypropylene, or a copolymer including at least one of ethylene and propylene, cellulose, or the like is suitable. A separator may have a single-layered structure or a laminated structure. A heat resistant layer or the like may be formed on the surface of the separator.

[Non-Aqueous Electrolyte]

The non-aqueous electrolyte includes: a non-aqueous solvent; and an electrolyte salt. The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ ($1<x<6$, and n is 1 or 2), $LiB_{10}Cl_{10}$, $LiCl$, $LiBr$, $LiI$, chloroborane lithium, lithium lower aliphatic carboxylates, borates such as $Li_2B_4O_7$ and $Li(B(C_2O_4)F_2)$, and imide salts such as $LiN(SO_2CF_3)_2$ and $LiN(C_lF_{2l+1}SO_2)(C_mF_{2m+1}SO_2)$ {1 and m each represent an integer of 0 or more}. As the lithium salt, one of these may be used singly, or a plurality of types of these may be mixed and used.

The non-aqueous solvent includes a cyclic carbonate. Examples of the cyclic carbonate include propylene carbonate (PC), ethylene carbonate (EC), butylene carbonate (BC), fluoroethylene carbonate (FEC) and fluoropropylene carbonate (FPC).

The total content of the cyclic carbonate is 20% by volume or more and 30% by volume or less based on the total volume of the non-aqueous solvent. However, the content of ethylene carbonate belonging to the cyclic carbonate is 10% by volume or less based on the total volume of the non-aqueous solvent. When the total content of the cyclic carbonate is more than 30% by volume, or the content of ethylene carbonate is more than 10% by volume, a coating is more likely to be formed sequentially on the surface of the negative electrode accompanying charge and discharge than in the case where the above range is satisfied, so that swelling of the negative electrode is made remarkable. When the total content of the cyclic carbonate is less than 20% by volume, for example, the input characteristics, the cyclic characteristics, or the like of the battery are deteriorated more in some cases than in the case where the above range is satisfied. In light of suppressing swelling of the negative electrode, suppressing deterioration in the input characteristics and the cyclic characteristics of the battery, and the like, the total content of the cyclic carbonate is preferably 22% by volume or more and 28% by volume or less based on the total volume of the non-aqueous solvent, and the content of ethylene carbonate is preferably 5% by mass or less, and more preferably 0% by mass (not containing ethylene carbonate) based on the total volume of the non-aqueous solvent.

The content of propylene carbonate belonging to the cyclic carbonate is preferably 10% by mass or less, more preferably 5% by mass or less, and still more preferably 0% by mass (not containing propylene carbonate) based on the total volume of the non-aqueous solvent in addition to that the total content of the cyclic carbonate and the content of ethylene carbonate satisfy the above ranges. When the content of propylene carbonate is more than 10% by mass, the negative electrode is swollen more significantly in some cases than in the case where the above range is satisfied.

The cyclic carbonate preferably includes fluoroethylene carbonate, and particularly, the cyclic carbonate included in the non-aqueous solvent is preferably fluoroethylene carbonate in terms of suppressing swelling of the negative electrode accompanying charging/discharging cycles. The content of each non-aqueous solvent is a value at 25° C.

The non-aqueous solvent includes a solvent other than the cyclic carbonate. Examples of the additional solvent other than the cyclic carbonate include a chain carbonate, a lactone, an ether, an ester, and an aromatic hydrocarbon. Among these, a chain carbonate, an ester, an ether, and the like is preferable, and a chain carbonate in particular is preferable in terms of suppressing deterioration in the input characteristics and the charging/discharging cycle characteristics of the battery, and the like.

Examples of the chain carbonate include dimethyl carbonate (DMC), ethyl methyl carbonate (EMC), and diethyl carbonate (DEC). Examples of the ester include ethyl acetate (MA), propyl acetate (PA), propyl propionate (EP), and propyl propionate (PP). Examples of the ether include diethyl ether, dipropyl ether, diisopropyl ether, dibutyl ether, and dihexyl ether.

The non-aqueous electrolyte includes vinylene carbonate as an additive. The content of vinylene carbonate in the non-aqueous electrolyte is preferably 0.2% by mass or more and 5% by mass or less, and more preferably 1% by mass or more and 3% by mass or less. When the content of vinylene carbonate satisfies the above range, swelling of the negative electrode accompanying charging/discharging cycles can effectively be suppressed.

EXAMPLES

Hereinafter, the present disclosure will further be described with Examples, but the present disclosure is not limited to these Examples.

Example 1

[Positive Electrode]

A lithium transition metal oxide represented by $LiNi_{1/3}Co_{1/3}Mn_{1/3}O_2$ was used as a positive electrode active material. A positive electrode mixture slurry was prepared by mixing 94.8 parts by mass of the positive electrode active material, 4 parts by mass of acetylene black, and 1.2 parts by mass of PVDF, and, further, adding an appropriate amount of N-methyl-2-pyrrolidone (NMP). Next, the positive electrode mixture slurry was applied on a positive electrode current collector excluding a part where a lead was to be connected, the positive electrode current collector formed of an aluminum foil, and the resultant coating film was dried. The coating film was rolled using a roller, and then cut into a predetermined electrode size to produce a positive electrode having a positive electrode mixture layer formed on each side of the positive electrode current collector.

[Negative Electrode]

A first negative electrode mixture slurry for the first layer was prepared by mixing graphite A (having a tap density of 0.89 g/cm$^3$ and a BET specific surface area of 6.3 m$^2$/g) as a first carbon-based active material, $SiO_x$ (x=0.94), as a Si-based active material, having a carbon coating, a lithium salt of PAA, a sodium salt of CMC, and a dispersion of SBR in a mass ratio of solid contents of 88/9/1/1/1, and adding an appropriate amount of water. In addition, a second negative electrode mixture slurry for the second layer was prepared by mixing graphite B (having a tap density of 1.08 g/cm$^3$ and a BET specific surface area of 2.8 m$^2$/g) as a second carbon-based active material, a sodium salt of CMC, and a dispersion of SBR in a mass ratio of solid contents of 98/1/1, and adding an appropriate amount of water.

Next, the first negative electrode mixture slurry was applied on each side of a negative electrode current collector excluding a part where a lead was to be connected, the negative electrode current collector formed of a copper foil, and the resultant coating film was dried to form the first layer on each side of the negative electrode current collector. Subsequently, the second negative electrode mixture slurry was applied on the first layer formed on each side of the negative electrode current collector, and the resultant coating film was dried to form the second layer. The coating film was rolled using a roller, and was then cut into a predetermined electrode size to produce a negative electrode having a negative electrode mixture layer formed on each side of the negative electrode current collector, the negative electrode mixture layer including the first layer and the second layer.

The masses of the first layer and the second layer in the negative electrode mixture layer were measured to find that the mass ratio of the second layer/the first layer was 0.67. In addition, the filling density of the negative electrode mixture layer was 1.65 g/cm$^3$.

[Non-Aqueous Electrolyte]

To a mixed solvent obtained by mixing fluoroethylene carbonate (FEC), dimethyl carbonate (DMC), and ethyl methyl carbonate (EMC) in a volume ratio of 20:40:40, 1% by mass of vinylene carbonate (VC) was added, and LiPF$_6$ was dissolved in a proportion of 1.2 mol/L in the resultant solution to prepare a non-aqueous electrolyte.

[Rectangular-Shaped Test Cell]

A lead was attached to each of the negative electrode and the positive electrode, and a lamination type electrode assembly in which the respective electrodes are alternately laminated one by one with separators interposed therebetween was produced. A single-layered polypropylene separator was used as the separator. The produced electrode assembly and the non-aqueous electrolyte were housed in a rectangular-shaped battery case to produce a rectangular-shaped test cell.

Example 2

A rectangular-shaped test cell was produced in the same manner as in Example 1, except that a mixed solvent obtained by mixing ethylene carbonate (EC), fluoroethylene carbonate (FEC), dimethyl carbonate (DMC), and ethyl methyl carbonate (EMC) in a volume ratio of 10:10:40:40 was used in the preparation of the non-aqueous electrolyte.

Example 3

A rectangular-shaped test cell was produced in the same manner as in Example 1, except that a mixed solvent obtained by mixing ethylene carbonate (EC), propylene carbonate (PC), dimethyl carbonate (DMC), and ethyl methyl carbonate (EMC) in a volume ratio of 10:10:40:40 was used in the preparation of the non-aqueous electrolyte.

Comparative Example 1

A rectangular-shaped test cell was produced in the same manner as in Example 1, except that a first negative electrode mixture slurry for the first layer was prepared by mixing graphite A (having a tap density of 0.89 g/cm$^3$ and a BET specific surface area of 6.3 m$^2$/g) as a carbon-based active material, SiO$_x$ (x=0.94), as a Si-based active material, having a carbon coating, a lithium salt of PAA, a sodium salt of CMC, and a dispersion of SBR in a mass ratio of solid contents of 92/6/1/1/1 and adding an appropriate amount of water; the first negative electrode mixture slurry was applied on each side of a negative electrode current collector excluding a part where a lead was to be connected, the negative electrode current collector formed of a copper foil, and the resultant coating film was dried to form the first layer on each side of the negative electrode current collector; and the second layer was not formed.

Comparative Example 2

A rectangular-shaped test cell was produced in the same manner as in Example 1, except that a mixed solvent obtained by mixing ethylene carbonate (EC), dimethyl carbonate (DMC), and ethyl methyl carbonate (EMC) in a volume ratio of 20:40:40 was used in the preparation of the non-aqueous electrolyte.

Comparative Example 3

A rectangular-shaped test cell was produced in the same manner as in Example 1, except that vinylene carbonate (VC) was not used in the preparation of the non-aqueous electrolyte.

Comparative Example 4

A rectangular-shaped test cell was produced in the same manner as in Example 1, except that a negative electrode produced in the same manner as in Comparative Example 1 was used and that a mixed solvent obtained by mixing ethylene carbonate (EC), dimethyl carbonate (DMC), and ethyl methyl carbonate (EMC) in a volume ratio of 20:40:40 was used, and vinylene carbonate (VC) was not used in the preparation of the non-aqueous electrolyte.

[Evaluation of Battery Swell Accompanying Charging/Discharging Cycles]

The thickness of each rectangular-shaped test cell of Examples and Comparative Examples at the time when a load of 1 MPa was applied on the central part vertical to the largest plane of the rectangular-shaped test cell was measured. After each rectangular-shaped test cell of Examples and Comparative Examples was restrained to a predetermined thickness using a metal plate, the test cell was charged at a constant current of 0.3 It until the battery voltage reached to 4.3 V, and then at a constant voltage of 4.3 V until the current reached to 1/50 It in a temperature environment of 25° C. Thereafter, the test cell was constant-current discharged at a constant current of 0.3 It until the battery voltage reached to 2.5 V. This charging/discharging cycle was performed 200 cycles. The rectangular-shaped test cell after 200 cycles was taken off from the metal plate, and the thickness at the time when a load of 1 MPa was applied on the central part vertical to the largest plane of the rectangular-shaped test cell was measured. The amount of battery swell [mm] was determined from the difference between the thickness of the rectangular-shaped test cell before the charging/discharging cycles and the thickness of the rectangular-shaped test cell after 200 cycles.

The amount of battery swell of the rectangular-shaped test cell of Example 1 was used as a standard (100), the amount of battery swell of each rectangular-shaped test cell of the other Examples and Comparative Examples was evaluated as a relative value, and Table 1 shows the evaluation results together.

TABLE 1

| | Negative electrode mixture layer | VC (wt %) | EC (Vol %) | FEC (Vol %) | PC (Vol %) | Amount of battery swell |
|---|---|---|---|---|---|---|
| Example 1 | Second layer: Graphite B/CMC/SBR<br>First layer: Graphite A/SiO/PAA/CMC/SBR | 1 | 0 | 20 | 0 | 100 |
| Example 2 | Second layer: Graphite B/CMC/SBR<br>First layer: Graphite A/SiO/PAA/CMC/SBR | 1 | 10 | 10 | 0 | 110 |
| Example 3 | Second layer: Graphite B/CMC/SBR<br>First layer: Graphite A/SiO/PAA/CMC/SBR | 1 | 10 | 0 | 10 | 140 |
| Comparative Example 1 | First layer: Graphite A/SiO/PAA/CMC/SBR | 1 | 0 | 20 | 0 | 210 |
| Comparative Example 2 | Second layer: Graphite B/CMC/SBR<br>First layer: Graphite A/SiO/PAA/CMC/SBR | 1 | 20 | 0 | 0 | 260 |

TABLE 1-continued

| Negative electrode mixture layer | | VC (wt %) | EC (Vol %) | FEC (Vol %) | PC (Vol %) | Amount of battery swell |
|---|---|---|---|---|---|---|
| Comparative Example 3 | Second layer: Graphite B/CMC/SBR<br>First layer: Graphite A/SiO/PAA/CMC/SBR | 0 | 0 | 20 | 0 | 230 |
| Comparative Example 4 | First layer: Graphite A/SiO/PAA/CMC/SBR | 0 | 20 | 0 | 0 | 310 |

As can be seen from Table 1, the battery swell accompanying the charging/discharging cycles was suppressed more in the rectangular-shaped test cells of Examples 1 to 3 than in the rectangular-shaped test cells of Comparative Examples 1 to 4.

REFERENCE SIGNS LIST 10 non-aqueous electrolyte secondary battery
11 electrode assembly
12 positive electrode terminal
13 negative electrode terminal
14 battery case
15 case body
16 sealing assembly
17 insulating member
20 negative electrode
30 negative electrode current collector
31 negative electrode mixture layer
32 first layer
33 second layer

The invention claimed is:

1. A rectangular-shaped non-aqueous electrolyte secondary battery, comprising:
   a positive electrode;
   a negative electrode; and
   a non-aqueous electrolyte having an electrolyte salt and a non-aqueous solvent,
   wherein the negative electrode comprises:
   a negative electrode current collector; and
   a negative electrode mixture layer formed on the negative electrode current collector,
   the negative electrode mixture layer has:
   a first layer formed on the negative electrode current collector, the first layer including a first carbon-based active material, a Si-based active material, and polyacrylic acid or a salt thereof; and
   a second layer formed on the first layer, the second layer including a second carbon-based active material,
   the first carbon-based active material has a tap density of 0.86 g/cm$^3$ to 0.89 g/cm$^3$ and a BET specific surface area of 3.9 m$^2$/g to 6.8 m$^2$/g,
   the second carbon-based active material has a tap density of 1.03 g/cm$^3$ to 1.08 g/m$^3$ and a BET specific surface area of 2.8 m$^2$/g to 3.1 m$^2$/g,
   the mass of the first layer is 50% by mass or more and less than 90% by mass based on the mass of the negative electrode mixture layer, the mass of the second layer is more than 10% by mass and 50% by mass or less based on the mass of the negative electrode mixture layer,
   the non-aqueous solvent includes a cyclic carbonate,
   the total content of the cyclic carbonate is 20% by volume or more and 30% by volume or less based on the total volume of the non-aqueous solvent,
   the content of fluoroethylene carbonate belonging to the cyclic carbonate is more than 0% by volume and 20% by volume or less based on the total volume of the non-aqueous solvent,
   the content of ethylene carbonate belonging to the cyclic carbonate is 10% by volume or less based on the total volume of the non-aqueous solvent,
   the non-aqueous electrolyte includes vinylene carbonate, and
   the content of the vinylene carbonate in the non-aqueous electrolyte is 0.2% by mass or more and 5% by mass or less.

2. The rectangular-shaped non-aqueous electrolyte secondary battery according to claim 1, wherein the content of fluoroethylene carbonate belonging to the cyclic carbonate is 10% by volume or more and 20% by volume or less based on the total volume of the non-aqueous solvent.

3. The rectangular-shaped non-aqueous electrolyte secondary battery according to claim 1, wherein the content of propylene carbonate belonging to the cyclic carbonate is 10% by volume or less based on the total volume of the non-aqueous solvent.

4. The rectangular-shaped non-aqueous electrolyte secondary battery according to claim 1, wherein the non-aqueous electrolyte does not contain ethylene carbonate.

* * * * *